United States Patent
Lokka

[15] 3,659,575
[45] May 2, 1972

[54] VACUUM BREAKER FOR AUTOMOBILE ENGINES

[72] Inventor: Leif Lokka, Haerland, Mysen, Norway
[22] Filed: Nov. 9, 1970
[21] Appl. No.: 87,686

Related U.S. Application Data

[63] Continuation-in-part of Ser. No. 792,971, Jan. 22, 1969, abandoned.

[30] Foreign Application Priority Data

Aug. 3, 1968    Norway ................................. 3060/68

[52] U.S. Cl. .......................... 123/124 R, 123/97 B, 137/480
[51] Int. Cl. ......................................................F02m 23/04
[58] Field of Search .......................... 123/97 B, 124 R, 119 D; 137/480

[56] References Cited

UNITED STATES PATENTS

| | | |
|---|---|---|
| 1,239,639 | 9/1917 | Torrens ................................. 137/480 |
| 1,630,362 | 5/1927 | Sutton ................................. 137/480 |
| 2,021,337 | 11/1935 | Trefz ................................. 137/480 |
| 2,518,082 | 8/1950 | Shively ................................. 123/124 R |
| 3,039,449 | 6/1962 | Mokrzycki ................................. 123/124 R |
| 3,561,409 | 2/1971 | August ................................. 123/119 D |
| 3,564,580 | 2/1971 | Cinque ................................. 123/124 |

*Primary Examiner*—Wendell E. Burns
*Attorney*—Jacobs & Jacobs

[57] ABSTRACT

A device for reducing the vacuum in the induction manifold of an engine and supplying additional air to said engine, having a spring-loaded, normally closed, one-way valve adapted to be controlled by the vacuum in the manifold, and a tubing leading from said valve to the manifold of the engine, said valve being substantially loaded by a constant counterforce means and to a smaller extent by spring force, said valve and tubing being arranged to pass air through the valve and tubing to the manifold when the valve is open. In a preferred embodiment, the valve is damped against vibrations.

10 Claims, 1 Drawing Figure

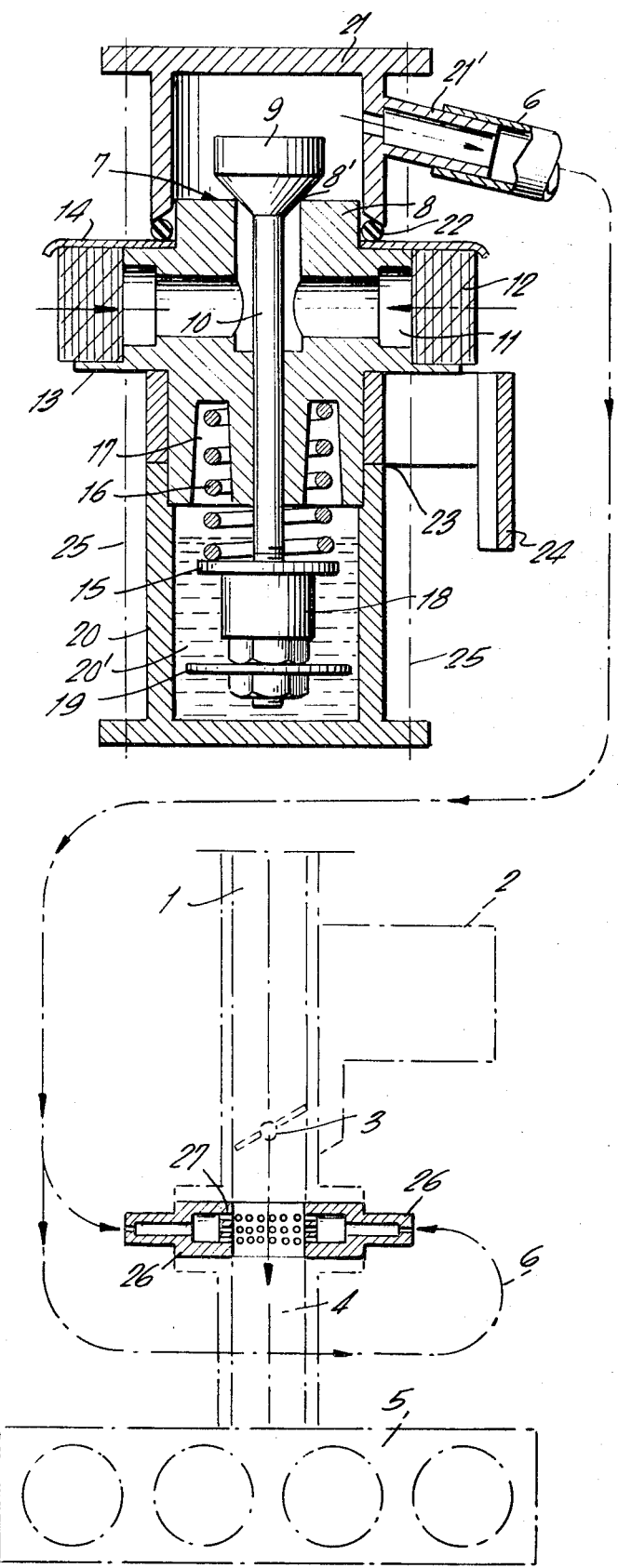

VACUUM BREAKER FOR AUTOMOBILE ENGINES

This a continuation-in-part of U.S. Ser. No. 792,971, filed Jan. 22, 1969, now abandoned.

The present invention relates to a device for reducing the vacuum in the induction manifold of an engine and supplying additional air to said engine.

One of the most important air pollution sources in towns is the carbon monoxide (CO) emitted with the exhaust of vehicle engines due to incomplete combustion of the gasoline, since the air/fuel mixture drawn into the manifold of the engine and distributed therefrom to the engine cylinders does not include a sufficient amount of air for complete combustion of the mixture, the mixture being too "rich."

Tests carried out have shown that the CO content of the exhaust may be around 10.0 percent by volume or less, depending on the revolutions per minute and the condition of the engine (adjustment, wear and the like), the CO content being highest at starting and idling and also during deceleration of the vehicle from high speeds.

Several proposals have been made to reduce the CO content of the engine exhaust, and in all of them the problem is solved by adding additional air in the manifold through a secondary valve. Such secondary valve is either governed by controls in such a way that the supply of additional air is made dependent upon the position of the carburetor throttle (the accelerator pedal of the car), or is spring-loaded and controlled by the vacuum in the manifold combined with advancing the ignition.

The drawback of the previously known systems is that the valves used to supply additional air were constructed to act according to the static vacuum or underpressure in the manifold, but they were also compulsorily controlled. See U.S. Pat. Nos. 1,961,062 and 2,035,775. As the valves were intended to open and close in timed relationship with the variation in pressure in the manifold, they were formed as flat disc valves with comparatively large diameter and very light weight, and preferably of leather. They were fitted as close as possible to the cylinder inlet valves (see U.S. Pat. No. 2,065,773). With such a design, the air had a very low rate of flow through the valve and it was only the difference in the static pressure on either side of the valve which caused it to open and close in timed relationship with the variations in pressure.

All the valves constructed on this principle, however, proved to be unsatisfactory. The air pressure in the manifold often varies so rapidly that such light disc valves rattle up and down on the valve seat during operation, which again gives rise to pulsating pressure and formation of eddy currents in the in-flowing air causing unstable idling. Simultaneously, there are disturbing rattling sounds and hissing while the valve is in action. Such valves, since they were previously fitted directly on the carburetor, the manifold itself or on its inlet pipe, were also affected by jolts and the vibrations of the engine.

It is thought that the reason why the known regulating means, which had to be spring loaded, cannot be used at lower driving speeds and at idling, is that the spring had to be so weak that it could not prevent rattling and uneven distribution of additional air at highest speeds.

The object of the present invention is to avoid these drawbacks.

The present invention consists in a device for reducing the vacuum in the induction manifold of an engine and supplying additional air to said engine, comprising a spring-loaded, normally closed one-way valve adapted to be controlled by the vacuum in the manifold, and a tubing leading to the manifold of the engine, the valve body of said valve being substantially loaded by a constant counterforce and only to a small extent by spring force. The air passes through the valve and tubing to the manifold when the valve is open. It is a feature of the device of the present invention that up to 10 percent, by volume, of additional air can be supplied to the manifold and from there to the cylinders.

In a preferred embodiment, the valve also has damping means to inhibit or prevent vibration of said valve during operation of the device. The damping means ensures that vibrations, rattling and the like are, if not entirely eliminated, at least reduced to such a degree that for all practical purposes they are non-existent and the air supply is smooth under all operating conditions.

By loading the valve body to a substantial extent by a constant counterforce, and only to a small extent by a spring, the valve is more sensitive than before. The counterforce is practically independent of the opening of the valve so that also at higher degrees of vacuum a sufficient quantity of air passes through the valve. In general, the ratio of the spring force to the constant counterforce will be from about 1:10 to about 1:50 when the motor is at rest, from about 1:4 to about 1:10 when the motor is idling, and from about 1:2 to about 1:4 when the motor is at maximum load. In this way, the constant counterforce substantially predetermines the flow through the valve, since it is substantially greater than the spring force. The constant counterforce can be provided by a weight urging the valve to a closed position, or by any other constant counterforce means, such as a pneumatic means.

Due to the fact that the CO content which actually represents a loss, is reduced, the thermal efficiency of the engine is increased with the result that the gasoline consumption is reduced.

According to a further feature of the invention, the cross-sectional area of the airflow between the valve section and the valve body is very small in relation to the area of the tube leading to the manifold, and actually is a maximum of 10 percent of the through flow area of the disc valves previously mentioned. In a preferred embodiment of the invention, the cross-sectional area of the air passage through the valve is from about 5 to about 20 percent of the cross-sectional area of the tubing leading from the valve to the manifold, e.g. about 12 percent. Consequently, the dynamic pressure of the air makes itself felt to a greater extent than before and keeps the valve body open without being hindered by outside factors, such as vibrations and jolts. The valve body floats on an air current, the quantity of which is controlled by the mean vacuum in the inlet tube to the manifold.

Furthermore, according to a preferred embodiment of the invention, the air is introduced in the manifold in a manner to prevent eddy currents. When eddy currents occur, air pockets are introduced into the gas mixture, but this is prevented in the preferred embodiment of the present invention.

The device according to the invention is desirably arranged remote from the carburetor and the manifold, and is connected with same via a resilient tube, such as a rubber hose.

The advantages obtained by the invention are as follows:
1. Substantial reduction of the CO content of the exhaust,
2. Improved combustion and consequently, a better fuel economy,
3. The engine cylinders, spark plugs and the exhaust tube are kept practically free from carbon.

An embodiment of the present invention will now be described with reference to the accompanying drawing which shows an additional air valve in axial section and schematically connected with the induction manifold of an engine.

In the drawing an air pipe 1 has a carburetor 2 mounted thereon and a throttle valve 3 which is controlled by an accelerator pedal (not shown). An induction manifold 4 is mounted on the cylinder block 5 of the engine.

The manifold 4 is connected via a flexible hose 6 with a valve 7 comprising a valve housing 8 which at its upper end forms a valve seat 8' for a valve body 9 attached to or integral with a valve stem 10. The latter extends with substantial clearance through the upper part of the valve housing 8 and through an air inlet 11 which is covered by a filter 12. The filter is maintained in position between a shoulder 13 on the housing 8 and a disc 14 resting against a shoulder on the upper portion of the housing.

The stem 10 extends from the lower portion of the housing 8 and carries on its lower end a disc 15 forming the abutment for a helical spring 16 which is arranged in a concentric recess 17 in the lower portion of the housing 8. A weight 18 and a disc 19 are also carried on the lower end of the stem 10 and held in position by nuts. The discs 15 and 19 and the weight 18 are located in an oil bath 20' in a container 20, between which container and the disc 19 there is only a small clearance so that a damping means or dashpot is formed. The valve body 9 is enclosed by a cover 21 arranged on the top of the valve housing 8 with a sealing gasket 22 positioned therebetween. The cover 21 has a hollow boss 21' extending from one side thereof which is connected to the hose 6. The valve housing is supported by a ring 23 clamped between the valve housing 8 and the oil container 20, the ring 23 forming part of a bracket having a fixing plate 24. The whole assembly is kept together by bolts 25 which pass through apertures in an upper flange on the cover 21 and through aligned apertures in the valve housing 8 and the flange on the underside of the oil container 20. By means of the bracket 23, 24 the valve unit is fixed to a wall of the vehicle's engine compartment, preferably through an intermediate resilient layer, but it is not mounted directly on the engine.

The air passed by the valve, the direction of flow of which is indicated by arrows, is supplied to a coupling piece 26 clamped between a flange on the manifold 4 and a corresponding flange on the air pipe 1. The coupling piece 26 forms an annular distribution chamber and has one or more air inlet bosses connected with the hose 6. The inner wall 27 of the distribution chamber has substantially the same diameter as the air pipe 1 and manifold 4, to form a smooth passage and preferably a number of through apertures as indicated so that the maximum amount of air can be introduced without turbulence.

As will appear from the above description, the valve 7 is controlled by the degree of vacuum in the manifold 4, and the total weight of the valve body 9, its stem 10 and weight 18 alone substantially predetermine the flow through the valve, the weight being substantially greater than the counterforce of the spring 16. Due to the small cross-sectional area between the valve seat 8' and the valve body 9 the air passes at high speed so that it is the dynamic pressure of the air which acts against the weight of parts 9, 10 and 18 and the counterforce of the spring 16. Due to the damping device 19, 20', vibrations are practically eliminated and the valve always operates smoothly and supplies a practically constant quantity of additional air through the hose 6 to the manifold 4 under all operating conditions of the engine.

By means of the valve according to the invention a very considerable reduction of the CO content of the exhaust is obtained, namely a reduction of between 75 to 98 percent, i.e. down to 0.1–0.2 percent by volume of CO. Also the other gas constituents in the exhaust are considerably reduced during all operating conditions. Despite the fact that the supply of additional air causes a leaner gas mixture, the engine power increases since the volumetric efficiency at each induction stroke is considerably increased. As a consequence of this a practically total elimination of the carbon deposit on the spark plugs, cylinder walls, valves and exhaust tube results. Since the additional air causes a reduction of the vacuum in the manifold 4, the braking effect of the engine increases to a great degree since the pistons have more gas to operate against. The gasoline consumption is reduced by 10 to 36 percent and the oil consumption by 40 to 60 percent. The vital components of the engine have a longer life, and simultaneously the engine will be "fresher" and easier to start. Due to the practically complete elimination of carbon deposits, the oil remains cleaner considerably longer than heretofore.

EXAMPLE

In a specific embodiment of the invention, a valve was constructed in accordance with the accompanying drawing wherein the total weight of valve body 9, weight 18, discs 15 and 19 and the nuts holding disc 19 in place was 365g. Spring 16 exerted a force of 10g when the engine was not running, about 60g when the engine was idling and about 120g when the engine was at maximum load. Tubing 6 and the valve passage in the upper part of housing 8 each had a diameter of 14 mm, and the valve stem 10 had a diameter of 6 mm, whereby the cross-sectional area of the valve passage was 81.5 percent of that of the tubing 6. This valve was employed in actual road tests to determine its efficacy in reduction of the CO and hydrocarbon content of automobile engine exhaust. These tests were carried out by the Norwegian Technical University in Trondheim, Norway, using three automobiles each equipped with the valve of the present invention described above, namely an eight-cylinder 1962 Rambler, a six-cylinder 1967 Rambler and a four-cylinder 1968 Renault 16. Each automobile was driven under the following conditions:

a. Town-driving—Driving in densely populated areas in heavy traffic, including traffic signals, at a maximum speed of about 30 miles per hour.
b. Hill-driving—Driving up a hill of about 10 percent slope.
c. Motor-brake—Driving down a hill of 10 percent slope while braking with the motor.
d. Road-driving—Driving in the country, up and down hills, at speeds between 30 and 60 miles per hour.

The results of the tests are reported in the Table below as an average of the data obtained from each of the three automobiles, except for the gasoline consumption. Gasoline consumption data were obtained only from the six-cylinder 1967 Rambler.

TABLE

[Results of an exhaust analysis at different driving conditions with and without the vacuum-breaker of the invention]

| Exhaust Gas | Town-driving | | Hill-driving | | Motor-brake | | Road-driving | |
|---|---|---|---|---|---|---|---|---|
| | With* | Without* | With | Without | With | Without | With | Without |
| Volume percent: | | | | | | | | |
| $O_2$ | 7.2 | 6.0 | 7.2 | 6.9 | 7.2 | 8.7 | 5.7 | 5.4 |
| $N_2$ | 84.2 | 82.3 | 84.7 | 84.7 | 84.7 | 85.6 | 84.8 | 83.7 |
| CO | 2.1 | 4.8 | 1.3 | 2.1 | 0.9 | 2.7 | 0.9 | 2.1 |
| Sum | 93.5 | 93.1 | 93.2 | 93.7 | 92.8 | 97.0 | 91.4 | 91.2 |
| Parts per million: | | | | | | | | |
| Methane | 50 | 416 | 80 | 108 | 52 | 166 | 60 | 122 |
| Ethane | 2 | 12 | 4 | 4 | 3 | 7 | 6 | 6 |
| Ethylene | 40 | 134 | 54 | 62 | 47 | 70 | 63 | 70 |
| Acetylene | 16 | 162 | 19 | 25 | 13 | 53 | 17 | 41 |
| Propylene | 9 | 30 | 6 | 11 | 7 | 11 | 12 | 13 |
| $C_4$ and higher calculated as $C_4$ | 8 | 34 | 1 | 6 | 6 | 7 | 11 | 14 |
| Sum hydrocarbon, p.p.m | 125 | 788 | 164 | 216 | 128 | 314 | 169 | 266 |
| Gasoline consumption, liters per 10 km | 3.4 | | 2.0 | 2.3 | 0.91 | 0.93 | 1.4 | 1.9 |

*="with" and "without" refer respectively to driving with and without the vacuum-breaker of the present invention.

These results are very significant since the valve of the present invention reduced the CO content of the exhaust gases to or below the present requirements of the State of California. With respect to CO and hydrocarbons, the valves are far better than presently required in California and also better than the requirements which will come into force in California in 1974.

What is claimed is:

1. A device for reducing the vacuum in the induction manifold of an engine and supplying additional air to said engine, comprising a spring-loaded, normally closed, one-way valve adapted to be controlled by the vacuum in the manifold, and a tubing leading from said valve to the manifold of the engine, said valve being substantially loaded by a constant counterforce means and to a smaller extent by spring force, said valve and tubing being arranged to pass air through the valve and tubing to the manifold when the valve is open.

2. A device as claimed in claim 1, wherein the cross-sectional area of the valve is small compared with the cross-sectional area of the tubing leading to the manifold.

3. A device according to claim 2, including a coupling means for preventing eddy currents, said coupling means being connected between said tubing and said manifold.

4. A device as claimed in claim 1, wherein said constant counterforce means is a counterweight, the spring force being small compared with said counterweight.

5. A device as claimed in claim 1, including means for damping vibrations of said valve during operation of the device.

6. A device as in claim 5, wherein said valve has a valve stem, and said damping means is a body of liquid and a disc fixed to the lower end of the valve stem, the disc being submerged in the liquid.

7. The device as claimed in claim 6, wherein said liquid is oil.

8. In an internal combustion engine having a throttle valve, a carburetor and an induction manifold connected downstream of the carburetor, the improvement which comprises a spring-loaded, normally closed, one-way valve adapted to be controlled by the vacuum in the induction manifold, a tubing connected at one end to the valve and at the other end to the induction manifold posterior to the throttle valve and the carburetor, said valve being substantially loaded by a constant counterforce and to a smaller extent by spring force, said valve and tubing being arranged to pass air through the valve and tubing to the induction manifold when the valve is open.

9. A device as claimed in claim 8, wherein the valve is mounted remote from said engine.

10. In an internal combustion engine having a throttle valve, an induction manifold and a carburetor, the improvement which comprises a spring-loaded, normally closed, one-way valve adapted to be controlled by the vacuum in the induction manifold, a tubing leading from the valve to the induction manifold of the engine and being connected to the induction manifold posterior to the throttle valve and the carburetor, a counterweight attached to the valve urging the valve to the normally closed position and a damping means to inhibit or prevent vibration of said valve during operation thereof.

* * * * *